US010699707B2

(12) United States Patent
James et al.

(10) Patent No.: US 10,699,707 B2
(45) Date of Patent: Jun. 30, 2020

(54) PROCESSING VOICE COMMANDS BASED ON DEVICE TOPOLOGY

(71) Applicant: Google Inc., Mountain View, CA (US)

(72) Inventors: Barnaby John James, Los Gatos, CA (US); David Roy Schairer, San Jose, CA (US); Amy Lynn Baldwin, Mountain View, CA (US); Vincent Yanton Mo, Sunnyvale, CA (US); Jun Yang, Cupertino, CA (US); Mark Spates, IV, San Francisco, CA (US); Lei Zhong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/719,756

(22) Filed: Sep. 29, 2017

(65) Prior Publication Data

US 2018/0096683 A1   Apr. 5, 2018

Related U.S. Application Data

(60) Provisional application No. 62/403,441, filed on Oct. 3, 2016.

(51) Int. Cl.
*G10L 15/22*   (2006.01)
*G10L 15/30*   (2013.01)
(Continued)

(52) U.S. Cl.
CPC ............ *G10L 15/22* (2013.01); *G10L 15/183* (2013.01); *G10L 15/30* (2013.01); *H04L 12/282* (2013.01);
(Continued)

(58) Field of Classification Search
CPC ......... G10L 15/00; G10L 15/22; G10L 15/26; G10L 15/30
See application file for complete search history.

(56) References Cited

U.S. PATENT DOCUMENTS 8,060,368 B2 * 11/2011 Osawa ........................... 704/10
9,576,578 B1    2/2017 Skobeltsyn et al.
(Continued)

FOREIGN PATENT DOCUMENTS

CN   1324175   11/2001
CN   102695122   9/2012
(Continued)

OTHER PUBLICATIONS

United Kingdom Intellecutal Property Office; Examination Report issued in Application No. 1715844.5 dated Apr. 3, 2018.
(Continued)

*Primary Examiner* — Paras D Shah
(74) *Attorney, Agent, or Firm* — Middleton Reutlinger

(57) ABSTRACT

Example aspects of the present disclosure are directed to processing voice commands or utterances. For instance, data indicative of a voice utterance can be received. A device topology representation can be accessed. The device topology representation can define a plurality of smart devices associated with one or more structures. The device topology representation can further define a location of each of the plurality of devices within the associated structures. A transcription of the voice utterance can be determined based at least in part on the device topology representation. One or more selected devices and one or more actions to be performed by the one or more selected devices can be determined based at least in part on the determined transcription and the device topology representation.

17 Claims, 8 Drawing Sheets

(51) Int. Cl.
*H04L 12/28* (2006.01)
*H04L 12/24* (2006.01)
*G10L 15/183* (2013.01)
*H04L 29/08* (2006.01)

(52) U.S. Cl.
CPC ........ *H04L 41/12* (2013.01); *G10L 2015/223* (2013.01); *G10L 2015/227* (2013.01); *G10L 2015/228* (2013.01); *H04L 67/125* (2013.01)

(56) References Cited

U.S. PATENT DOCUMENTS

| | | | |
|---|---|---|---|
| 9,892,732 B1* | 2/2018 | Tian | G10L 15/00 |
| 9,984,686 B1* | 5/2018 | Mutagi | H04L 12/2816 |
| 2013/0073293 A1* | 3/2013 | Jang | G10L 15/22 |
| | | | 704/275 |
| 2014/0039888 A1 | 2/2014 | Taubman et al. | |
| 2014/0324431 A1* | 10/2014 | Teasley | G10L 15/22 |
| | | | 704/246 |
| 2015/0106086 A1 | 4/2015 | Oh et al. | |
| 2015/0140990 A1* | 5/2015 | Kim | H04W 8/186 |
| | | | 455/418 |
| 2015/0154976 A1 | 6/2015 | Mutagi | |
| 2015/0279360 A1 | 10/2015 | Mengibar et al. | |
| 2016/0043962 A1* | 2/2016 | Kim | H04L 67/02 |
| | | | 709/224 |
| 2016/0155443 A1* | 6/2016 | Khan | G06F 1/3203 |
| | | | 704/275 |
| 2016/0164748 A1* | 6/2016 | Kim | G06N 5/046 |
| | | | 706/47 |
| 2016/0365092 A1 | 12/2016 | Moreno Mengibar et al. | |
| 2017/0032783 A1* | 2/2017 | Lord | G10L 15/22 |

FOREIGN PATENT DOCUMENTS

| | | |
|---|---|---|
| CN | 104145304 | 11/2014 |
| CN | 105575386 | 5/2016 |
| JP | 2005195834 A | 7/2005 |
| JP | 2009042298 A | 2/2009 |
| JP | 2010078877 A | 4/2010 |
| WO | WO 2016/085776 | 6/2016 |

OTHER PUBLICATIONS

International Search Report for PCT/US2017/053600 dated Dec. 22, 2017, 11 pages.
European Patent Office; Written Opinion of the International Preliminary Examining Authority of PCT Ser. No. PCT/US2017/053600; 7 pages; dated Sep. 5, 2018.
United Kingdom Intellectual Property Office; Notice of Intention to Grant under Section 18(4) of Application No. GB1715844.5; 2 pages; dated Oct. 23, 2018.
United Kingdom Intellectual Property Office; Examination Report issued in Application No. 1818906.8 dated Dec. 24, 2018.
International Bureau of WIPO; International Preliminary Report on Patentability of Ser. No. PCT/US2017/053600; 8 pages; dated Apr. 18, 2019.
The Japanese Patent Office; Office Action issued in Application No. 2019-517920 dated Sep. 2, 2019.
The Korean Intellectual Property Office; Office Action issued in Application No. 10-2019-7010435 dated Aug. 21, 2019.
The Korean Intellectual Property Office; Notice of Allowance issued in Application No. 10-2019-7010435 dated Feb. 4, 2020. (4 Pages).
The Japanese Patent Office; Notice of Allowance issued in Application No. 2019-517920 dated Feb. 25, 2020. (3 Pages).
The Korean Intellectual Property Office; Decision of Rejection issued in Application No. 10-2019-7010435 dated Dec. 10, 2019.
Chinese Patent Office; Office Action issued in Application No. 201710924487.6 dated Jul. 2, 2019. 34 Pages.
Chinese Patent Office; Office Action issued in Application No. 201710924487.6 dated Feb. 28, 2020. 28 Pages.
European Patent Office; Communication Pursuant to Article 94(3) issue in Application No. 17781302.9; dated Apr. 3, 2020.

\* cited by examiner

PROCESSING VOICE COMMANDS BASED ON DEVICE TOPOLOGY

FIELD

The present disclosure relates generally to interpreting voice utterances, and more particularly to interpreting voice utterances based on a topology of devices.

BACKGROUND

There is a proliferation of smart, multi-sensing network connected devices such as sound speakers, home alarms, door locks, cameras, lighting systems, treadmills, weight scales, smart beds, irrigation systems, garage door openers, appliances, baby monitors, fire alarms, etc. These smart devices can be located, for instance, within the confines of a building and a user may desire to interact with such smart devices. To do so, the user may use a control device to wirelessly communicate with the smart devices, for instance, via a network.

In some instances, the user may wish to communicate with one or more smart devices by providing a voice command or utterance to the control device. Conventional voice command processing techniques use various suitable automatic speech recognition, natural language processing, and/or natural language understanding techniques to process and interpret the voice utterance and to control the smart device(s) in accordance with the voice utterance. However, such conventional techniques are often unable to interpret complex voice utterances, and can require a request for more information from the user. In particular, such conventional techniques often lack a sufficient understanding of devices within a smart home network and the relationships between such devices within the network.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of processing voice utterances. The method includes receiving, by one or more computing devices, data indicative of a voice utterance. The voice utterance is provided by a user to a control device. The method further includes accessing, by the one or more computing devices, a device topology representation. The device topology representation defines a plurality of smart devices associated with one or more structures. The device topology representation further defines a location of each of the plurality of devices within the associated structures. The method further includes determining, by the one or more computing devices, a transcription of the voice utterance based at least in part on the device topology representation. The method further includes determining, by the one or more computing devices, one or more selected devices and one or more actions to be performed by the one or more selected devices based at least in part on the determined transcription and the device topology representation.

Other example aspects of the present disclosure are directed to systems, apparatus, tangible, non-transitory computer-readable media, user interfaces, memory devices, and electronic devices for processing voice commands.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
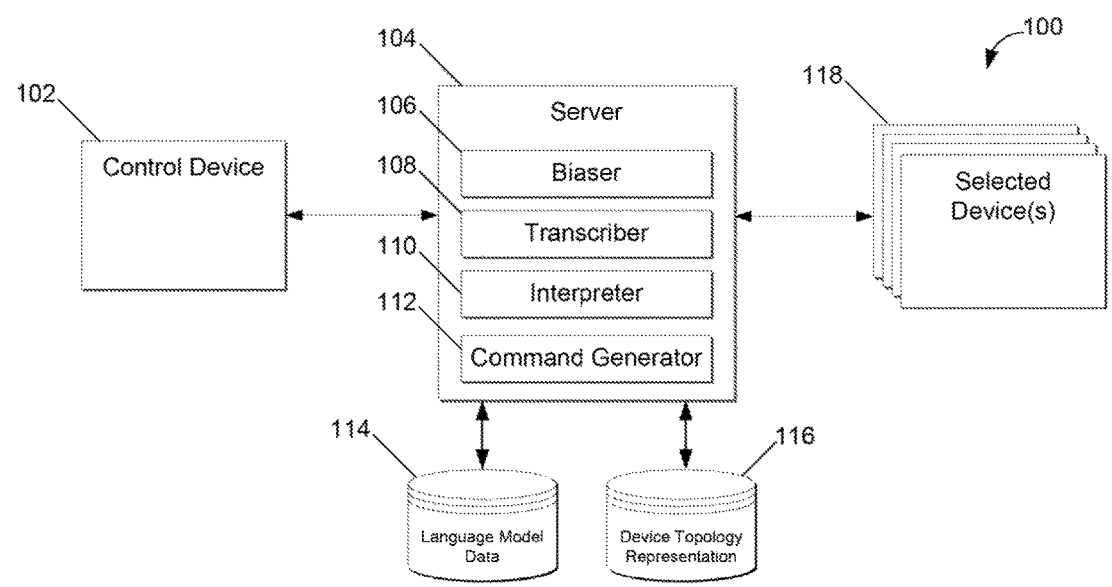
FIG. 1 depicts an overview of an example system for processing voice commands according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling smart devices based on voice commands from a user. For instance, a voice utterance can be received from a user of a control device. The voice utterance can be a command spoken by a user proximate the user device configured to control one or more smart devices. A smart device can be an intelligent, multi-sensing, network-connected device configured to communicate with a central server, a cloud-computing system, and/or one or more additional smart devices to provide any of a variety of useful smart home services. For instance, a smart device can be, or can otherwise be associated with, an air conditioning system, lighting device, home theater and entertainment system, security system, automatic door locking system, thermostat device, home automation system, sound speaker, camera device, treadmill, weight scale, smart bed, irrigation system, garage door opener, appliance, baby monitor, fire alarm, and/or other suitable device or system.

A user that desires to control one or more smart devices can construct a device topology representation. The device topology representation can be constructed using various suitable techniques and can be any suitable format and/or structure capable of representing the topology and organization of one or more smart devices within one or more structures. The device topology representation can define and/or organize one or more structures associated with the user. For instance, a structure associated with the user can be a home, business, vehicle, office, and/or any other suitable structure associated with the user. The user can organize each structure into one or more rooms (e.g. bedroom, living room, kitchen), and can assign one or more smart devices to the one or more rooms. For instance, the user can assign one or more smart lights to a first room of a particular structure, and one or more door locking systems to a second room of the structure. The user can then assign one or more different smart devices to one or more rooms within a second structure.

The user can assign one or more identifiers to the smart devices within the device topology representation. The identifiers can be chosen by the user and associated with the respective smart devices within the device topology representation. The identifier(s) can include nicknames and/or aliases selected for the smart devices by the user (e.g. couch lamp, front door lock, bedroom speaker, etc.). In this manner, the identifiers can be names or aliases of the respective smart devices that the user is likely to use when providing voice utterances for controlling the smart devices.

The device topology representation can further specify one or more device attributes associated with the respective devices. The device attributes can be associated with one or more actions that the smart devices are configured to perform. For instance, the device attributes associated with a lighting device can include a turn on capability, a turn off capability, a dimming capability, and/or other suitable attributes associated with the lighting device. As another example, an automatic door locking device can include a locking capability, an unlocking capability and/or other suitable capability.

The user can provide a voice utterance to a control device. The voice utterance can be any suitable voice utterance specifying an intent to control one or more smart devices. For instance, a user may provide a voice utterance with the intent of changing a state of a smart device (e.g. turning a smart device on or off, increasing the volume of a smart device, etc.), or with the intent of receiving information associated with the smart device (e.g. information associated with a current temperature, etc.). A control device can be any suitable device capable of receiving a voice utterance from the user, and communicating with one or more smart devices or a central server, for instance, via a network. The control device can be a device that the user speaks to in providing the voice utterance. In some implementations, the control device can be a user device associated with the user, such as a smartphone, tablet, laptop computer, desktop computer, wearable computing device, and/or other suitable user device. In some implementations, the control device can be a smart device configured to receive a voice utterance. For instance, the control device can be a smart device specified in the device topology representation.

The voice utterance can be interpreted to determine a control command intended by the user for one or more smart devices. In this regard, speech recognition can be performed on the voice utterance based at least in part on the device topology representation. For instance, data indicative of the voice utterance can be provided to one or more language models to determine a transcription of the voice utterance. In some implementations, a general language model can be biased towards the device topology representation to determine a text transcription of the voice utterance. The general language model can include a plurality of common phrases and can correlate probability estimates with each phrase. Each phrase can contain a sequence of one or more words. The probability estimates can specify a predicted occurrence of the respective phrases. It will be appreciated that various suitable general language models can be used without deviating from the scope of the present disclosure.

The general language model can be biased towards the device topology representation to generate a personalized language model. In particular, the general language model can be biased by increasing the probability estimates associated with one or more words or phrases associated with the device topology representation. For instance, the one or more words or phrases can include room names, structure names, device identifiers, terms associated with the device attributes, etc. specified in the device topology representation. In this manner, the personalized language model can estimate a higher probability of occurrence of words or phrases included in the device topology representation.

The data indicative of the voice utterance can be provided to the personalized language model to determine a text transcription of the voice utterance based on the personalized language model. In some implementations, the data indicative of the voice utterance can be provided to the general language model to determine a first transcription of the voice utterance based on the general language model. A first confidence score can be determined for the first transcription indicative of a confidence of the accuracy of the first transcription. The data indicative of the voice utterance can then be provided to the personalized language model to determine a second transcription of the voice utterance based on the personalized language model. A second confidence score can be determined for the second transcription indicative a confidence of the accuracy of the second transcription. In some implementations, the transcription having the higher confidence score can be used. In some implementations, the data indicative of the voice utterance can further be provided to one or more additional language models, such as one or more specialized language models associated with various suitable applications. In this manner, one or more additional transcriptions can be determined using the additional language models, each transcription having an associated confidence score. The transcription having the highest confidence score can be used.

Once the transcription of the voice utterance is determined, one or more devices to control (e.g. selected devices), and one or more actions to be performed by the selected devices can be determined. For instance, a semantic interpretation of the transcription can be determined using one or more semantic interpretation techniques. The semantic interpretation can provide a representation of the conceptual meaning of the transcription. In this manner, the interpretation of the transcription can provide an interpretation of the intent of the user in performing the voice utterance. As an example, if a transcription of a voice utterance from a user states to "turn on the lights," the semantic interpretation of the transcription can attempt to determine an action to be performed (e.g. an activation of one or more light devices), and one or more selected devices to perform the action (e.g. one or more appropriate lighting devices intended to be controlled by the user).

The interpretation can be determined based at least in part on the device topology representation. For instance, the device topology representation can be accessed to determine the one or more selected devices and/or the action to be performed. In this manner the device topology representation can be accessed and compared against the transcription to determine a match between one or more terms associated with the transcription and one or more terms associated with the device topology representation. For instance, if the transcription reads "turn on the couch lamp," the device topology representation can be accessed to determine if there is a device specified in the device topology representation having a device identifier of "couch lamp."

As indicated, one or more actions to be performed by the selected device(s) can also be determined. For instance, the action(s) can be determined based on the interpretation of the transcription. In some implementations, the actions can be determined based at least in part on the device attributes associated with the selected device(s) as specified in the device topology representation. In this manner, an identified action can be an action that a selected device is capable of performing.

In some instances, a direct match between the device identifiers specified in the device topology and the terms of the transcription may not be able to be determined. For instance, the user may not specify a device identifier when performing the voice utterance, but may give a more informal instruction. As another example, multiple structures specified in the device topology representation may include one or more rooms and/or devices having the same or similar names or identifiers. As an example, a transcription reading "turn on the lights in the bedroom," may not include a reference to a specific device identifier, such that a direct match cannot be determined. In such instance, the device topology representation may be accessed to infer one or more selected devices. For instance, the device topology representation can be accessed to identify a room labeled "bedroom" in a structure specified in the device topology representation. If such "bedroom" is identified, one or more appropriate devices located within the bedroom can be identified. For instance, if the device topology representation specifies one or more lighting devices within the bedroom, at least one of the one or more lighting devices can be inferred as the selected device(s).

In instances wherein a device identifier is not specified in the transcription, the one or more selected devices and/or the action(s) to be performed can be determined based at least in part on the device attributes specified in the device topology representation. For instance, the device attributes specified in the device topology representation can be compared to the transcription to determine one or more devices capable of performing an action specified in the transcription. In this manner, the selected devices can be inferred based at least in part on the respective device attributes.

In some implementations, the selected devices and/or the actions to be performed can be determined based at least in part on contextual data, such as a location of the user. For instance, in response to receiving a voice utterance from a user, a location of the user can be determined. The location can be determined using various suitable location determination techniques. The location determination technique can be determined based at least in part on the control device to which the user provides the voice utterance. For instance, control device is a smart device that is specified in the device topology representation, the user location can be mapped to the structure and/or room to which the control device is assigned in the device topology representation. If the control device is a user device not specified in the device topology representation, the user location can be determined using one or more location determination techniques, such as techniques using wireless access points or short range beacon devices associated with one or more smart devices, and/or other suitable location determination techniques. The user location can then be mapped to one or more structures and/or rooms specified in the device topology representation.

In this manner, the user location can be used as contextual data in determining one or more selected devices. For instance, in response to receiving a transcription that reads "turn on the lights," the user location can be determined and mapped to one or more rooms and/or structures specified in the device topology representation to determine the structure and room in which the user is located. One or more light devices can be identified within such structure and room to determine the selected devices intended to be controlled by the user. In this manner, in such instance, it can be inferred that the lights that the user wishes to control are the lights in the room in which the user is currently located.

Upon a determination of the one or more selected devices to be controlled and the one or more actions to be performed by the selected device(s), one or more control commands can be generated, and respectively provided to the selected device(s). The one or more control commands can include instructions for the selected device(s) to perform the specified actions. Upon receiving the appropriate control commands, the selected device(s) can perform the appropriate actions in accordance with the received control command(s). In some implementations, if one or more selected devices and/or actions to be performed cannot be determined based on the received voice utterance, the user can be provided with a prompt (e.g. within a user interface displayed by the control device or other suitable device) requesting that the user clarify the voice utterance and/or manually select one or more actions to be performed by one or more smart devices.

In this manner, example aspects of the present disclosure can be used to improve an efficiency and accuracy of voice command processing for use in a smart home and/or internet of things environment. In particular, organizing smart devices relative to a topology of one or more structures in which the smart devices are located can allow for a more robust interpretation of voice utterances, and can allow for a natural "conversation-like" communication experience between the user and the control device. Accounting for contextual data, such as user location, in conjunction with the device topology can provide for a greater ability to infer the meaning of voice utterances provided by the user. In addition, such voice command processing techniques can allow for fewer communication rounds between the user and the system by facilitating an ability to accurately, and more quickly interpret a broader range of voice utterances. As such, the number of operations performed by the smart device can be reduced, for example, receiving and processing a repeated voice utterance, or outputting a request for more information and processing the reply can be avoided, and the power consumption of the smart device can thus be reduced. Although the present disclosure is directed to processing voice commands in a smart home and/or internet of things environment, it will be appreciated that example aspects of the present disclosure can be expanded to various other suitable applications and environments without deviating from the scope of the present disclosure. For instance, example aspects of the present disclosure can be used to process and interpret voice commands used to control various other suitable non-internet of things devices.

With reference now to the figures, example aspects of the present disclosure will be described in greater detail. For instance, FIG. 1 depicts an overview of an example system 100 for processing voice commands according to example embodiments of the present disclosure. System 100 includes a control device 102 and a server 104. Control device 102 and the server 104 can communicate, for instance, via a network. Control device 102 can be any suitable device configured to monitor for and receive a voice utterance from a user. As indicated, the voice utterance can be a sentence or phrase spoken by the user with the intent of controlling one or more smart devices. The control device 102 can be a user device associated with the user. In some implementations, the control device 102 can be a smart device. A smart device can be a network-connected device configured to communicate with a central server, a cloud-computing system, and/or one or more additional smart devices to provide any of a variety of useful smart home and/or internet of things services. The control device can be configured dynamically based on the provision of the voice utterance by the user. For instance, the control device can be the device (e.g. user device, smart device, or other device) that receives the voice utterance from the user.

Upon receiving the voice utterance from the user, the control device 102 can provide data indicative of the voice utterance to the server 104. The server 104 includes a biaser 106, a transcriber 108, an interpreter 110, and a command generator 112. The data indicative of the voice utterance can be provided to the transcriber 108. The transcriber 108 can be configured to determine one or more text transcriptions of the voice utterance based at least in part on language model data 114. The language model data 114 can include one or more language models for transcribing the voice utterance. In particular, the language model data 114 can include a general language model specifying probability estimates for a plurality of common phrases. The language model data 114 can further include one or more specialized language models, such as for instance a personalized language model. The personalized language model can be generated by the biaser 106. In particular, the personalized language model can be generated by biasing the general language model towards a device topology representation 116.

Figure 2:
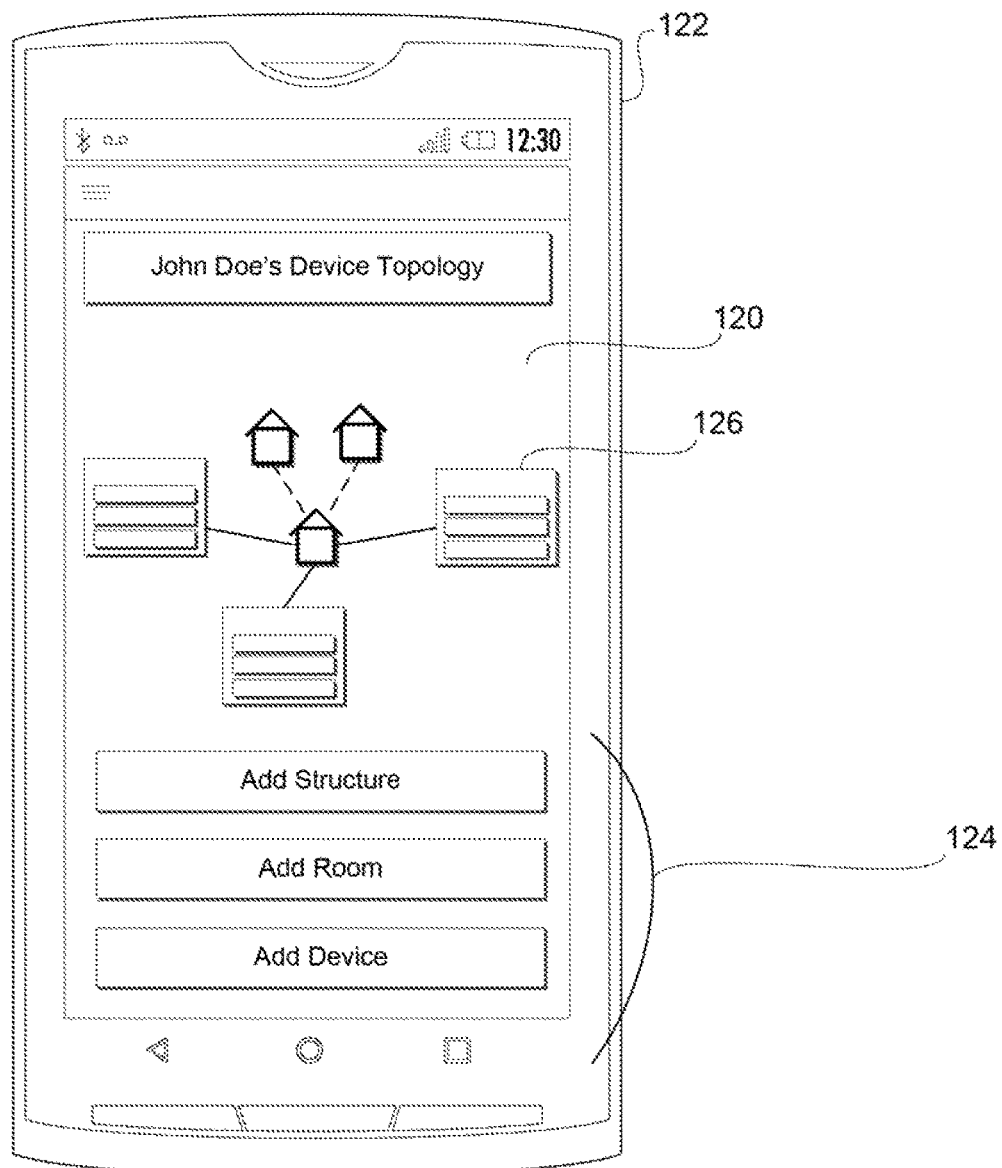
FIG. 2 depicts an example user interface for implementing a device topology representation according to example embodiments of the present disclosure.

The device topology representation 116 can be constructed by the user to define an organizational topology of one or more smart devices associated with the user. For instance, FIG. 2 depicts an example user interface 120 for defining a device topology representation. In particular, FIG. 2 depicts a user device 122 configured to display the user interface 120. It will be appreciated that the user interface 120 depicted in FIG. 2 is intended for illustrative purposes only, and that various other suitable user interfaces can be used to implement a device topology representation without deviating from the scope of the present disclosure. The user device 122 can be any suitable user device, such as a smart phone, tablet, laptop computer, desktop computer, wearable computing device, etc. In some implementations, the user device 122 can be a smart device or other device. In some implementations the user may need to be present at a location to define the device topology representation for that location. For instance, in such implementations, a user that desires to define a device topology representation for a particular structure will need to be located at the structure to implement the device topology representation. In this manner, a location of the user can be determined using various suitable location determination techniques and the user may be permitted to define a device topology representation for a structure located at or near the user location.

The user interface 120 can include one or more user interface elements 124 for facilitating an implementation of a device topology representation 126 by a user. The device topology representation 126 can correspond to the device topology representation 116 depicted in FIGS. 1 and 3. As shown, the one or more user interface elements 124 include interface elements allowing a user to add a structure, add a room, and add a device to the device topology representation 126. In this manner, the user can interact with the user interface elements 124 as desired to define and organize the device topology representation 126. For instance, the user can select the "Add Device" interface element to add a new smart device to the device topology representation 126. In this manner, the user may be able to add the new device, add one or more device identifiers to be associated with the device, add one or more device attributes to be associated with the device, etc. Similarly, if the user were to select the "Add Room" interface element, the user may be able to add a new room to a particular structure, add a room identifier to be associated with the room, etc.

In some implementations, the device topology representation 126 can be an interactive user interface element, such that the user can interact with the device topology representation 126 as displayed within the user interface 120. For instance, the user can select (e.g. through a touch input, or other suitable input) a particular structure, room, or device of the device topology representation 126 to facilitate a presentation of more information associated with the selected structure, room, or device.

Figure 3:
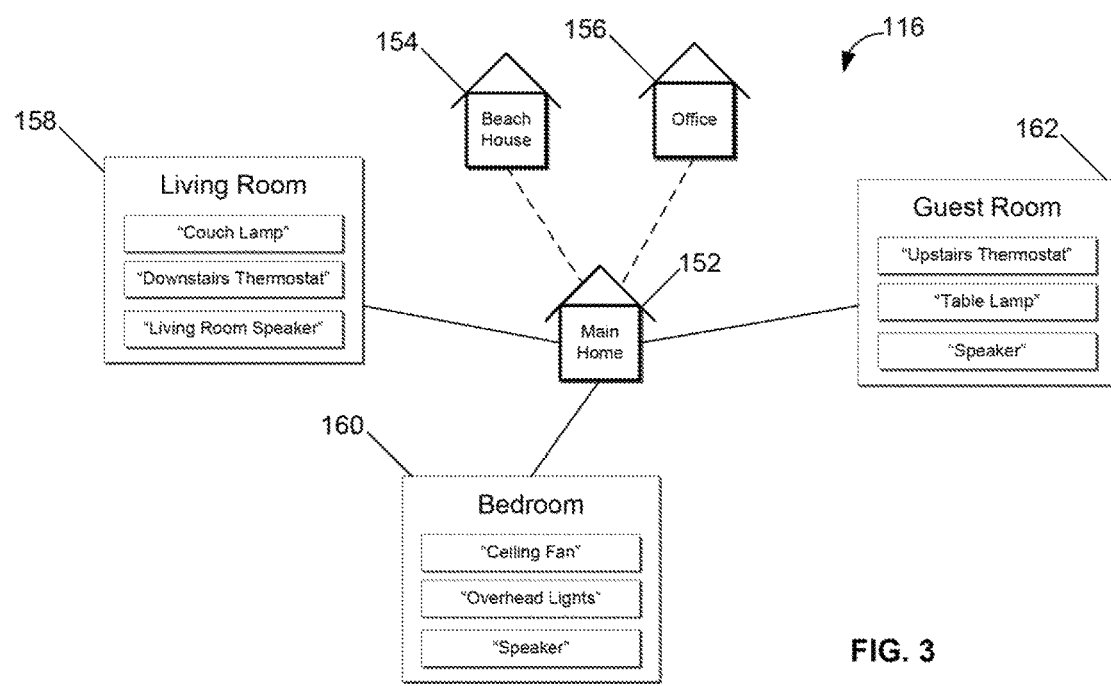
FIG. 3 depicts a block diagram of an example device topology representation according to example embodiments of the present disclosure.

FIG. 3 depicts a block diagram of an example device topology representation 116 according to example embodiments of the present disclosure. The device topology representation 116 defines a topology of a plurality of smart devices within a plurality of structures associated with the user. In particular, the structures include a main home 152, a beach house 154, and an office 156 associated with the user. Each structure can be organized in to one or more rooms within the structure. For instance, FIG. 3 depicts a living room 158, a bedroom 160, and a guest room 162 associated with the main home 152. Each room can be associated with one or more smart devices within a smart home and/or internet of things network associated with the user. In particular, the living room 158 is associated with a lighting device having a device identifier of "couch lamp," a thermostat device having a device identifier of "downstairs thermostat," and a speaker device having a device identifier of "living room speaker." The bedroom 160 is associated with a ceiling fan device having a device identifier of "ceiling fan," one or more lighting devices having device identifier(s) of "overhead lights," and a speaker device having a device identifier of "speaker." The guest room 162 is associated with a thermostat device having a device identifier of "upstairs thermostat," a lighting device having a device identifier of "table lamp," and a speaker device having a device identifier of "speaker." The specified devices can be a single device or a group of devices. For instance, the device identifier "overhead lights" can correspond to a single lighting device or a group of lighting devices that make up the overhead ceiling lights in the bedroom.

As indicated, the user can define one or more structures and one or more rooms within the device topology representation. The user can assign identifiers to each room and structure. The user can assign one or more smart devices to each room to represent a topology of devices within the rooms of the actual structure. The user can further assign one or more device identifiers to each the one or more smart devices. In some implementations, if the user does not assign a device identifier to a device, the device can be automatically assigned a default device identifier. The device topology representation 116 can further specify one or more device attributes for each device. The device attributes can be associated with one or more actions that the devices can perform. For instance, a light device can have a "turn on" attribute, a "turn off" attribute, a "dimming" attribute, etc. A ceiling fan device can have a "turn on" attribute, a "turn off" attribute, an "increase speed" attribute, a "decrease speed" attribute, etc. In some implementations, the device attributes can be input to the device topology representation 116 by the user. In some implementations, the device attributes can be automatically added to the device topology representation 116.

The device topology representation can be updated or modified by the user as the user desires to reflect, for instance, one or more changes to the device topology. For instance, the user can add devices, remove devices, move devices between rooms and/or structures, add structures, remove structures, add rooms, remove rooms, etc. as the user desires. In this manner, the user can organize the device topology to provide an accurate and dynamic topology of the devices within the actual structures.

The device topology representation 116 can be used to bias the general language model. Referring back to FIG. 1, the biaser 106 can be configured to access the device topology representation 116 and the general language model to bias the general language model towards the device topology representation 116. For instance, the biaser can identify one or more terms or phrases specified in the device topology representation 116 (e.g. device identifiers, room names, structure names, device types (e.g. lighting device, speaker device), device attributes, etc. The biaser 106 can increase a probability estimation of those terms as specified by the general language model, and can generate a personalized language model, such that the identified terms or phrases are assigned the increased probability estimates. In this manner, the personalized language model can be generated to reflect the increased likelihood that the voice utterance provided by the user will include terms or phrases associated with the device topology representation 116.

As indicated, the transcriber 108 can determine one or more text transcriptions of the voice utterance based at least in part on the language model data 114. It will be appreciated that the transcriber 108 can determine the text transcriptions of the voice utterance using various suitable speech recognition techniques. In some implementations, the transcriber 108 can determine a transcription of the voice utterance based on the personalized language model generated by the biaser 106. In some implementations, the transcriber 108 can determine one or more additional transcriptions of the voice utterance using one or more additional language models (e.g. the general language model and/or one or more other suitable language models associated with language model data 114). In such implementations, a confidence score can be determined for each transcription specifying a confidence of the transcriber 108 that the respective transcriptions are accurate transcriptions of the voice utterance. A transcription can then be selected from the plurality of transcriptions based at least in part on the confidence scores. In some implementations, if the selected transcription is the transcription determined using the personalized language model, the selected transcription can be provided to the interpreter 110.

In some implementations, a device topology representation can be selected for use based at least in part on a location of the user. For instance, it can be determined that the user is located within a particular structure specified within a device topology representation. The device topology representation specifying that structure can then be accessed for use in processing a voice utterance provided by the user. In such implementations, the accessed device topology representation can then be used to determine a transcription of a voice utterance provided by the user. In this manner, the transcription can then be determined based at least in part on a location of the user. For instance, upon a determination of the location of the user, the corresponding device topology representation can be accessed and one or more terms associated with the device topology representation can be used to bias the general language model. In some implementations, a personalized language model for the structure and/or the device topology representation may have previously been generated, in which case, in response to determining the user location and/or receiving a voice utterance from the user, the appropriate personalized language model may be accessed and used to determine the transcription of the voice utterance. Such device topology representation corresponding to the user location can then be used to interpret the voice utterance according to example aspects of the present disclosure.

The determined transcription can be provided to the interpreter 110. The interpreter 110 can be configured to determine an intent of the user in providing the voice utterance to the control device 102. In particular, the interpreter 110 can be configured to determine one or more selected devices 118, and one or more actions to be performed by the selected devices 118 based at least in part on the transcription. For instance, in some implementations, the interpreter 110 can perform semantic interpretation techniques on the transcription to determine a logical representation of a conceptual meaning of the transcription. In this manner, the interpreter 110 can determine a role of each word in the transcription by recognizing a semantic relationship between the words.

The interpreter 110 can determine the one or more selected devices 118 and/or the actions to be performed based at least in part on the device topology representation 116. For instance, the interpreter 110 can compare the transcription against the device topology representation 116 to determine the selected devices 118 and/or the actions to be performed. In particular, the interpreter 110 can compare the transcription to the device identifiers specified in the device topology representation 116 to determine a correlation between one or more terms of the transcription and one or more device identifiers. For instance, if the transcription reads "turn the volume up on the living room speaker," the terms living room speaker can be correlated to the device identifier "Living Room Speaker" of the device topology representation 116. In this manner, the speaker device having the device identifier "living room speaker" can be selected as the selected device based on the correlation.

In some implementations, the interpreter 110 can be configured to infer the one or more selected devices. For instance, if an exact match between a device identifier and the transcription cannot be found, the interpreter can be configured to infer one or more selected devices. As another example, if two or more devices specified in the device topology representation have the same or similar device identifiers, the interpreter 110 may not be able to determine which device the user intended to be controlled. For instance, the device topology representation 116 includes speaker devices having the same device identifier of "speaker" in both the bedroom 160 and the guest room 162. In such instance, the interpreter 110 may not be able to distinguish which speaker device that the user wishes to be controlled. The interpreter 110 may then be configured to infer the selected device based at least in part on other information associated with the device topology representation 116 and/or the user.

As one example, the interpreter 110 may be configured to infer the selected devices if there is not a direct match between the transcription and the device identifiers but the transcription includes one or more terms that are sufficiently similar to a device identifier specified in the device topology representation 116. In such instance, the interpreter 110 can correlate the sufficiently similar term(s) and device identifier, and can infer the selected device based on the similarity. For instance, if the transcription reads "turn on the sofa lamp," the interpreter 110 can identify the device identifier "couch lamp," and can determine that the phrase "sofa lamp" is sufficiently similar to the device identifier "couch lamp." The interpreter 110 can then select the lighting device having the identifier "couch lamp" as the selected device.

In some implementations, the interpreter 110 can infer the selected devices based at least in part on the device attributes specified in the device topology representation 116. The device attributes can specify a type of each device (e.g. lighting device, speaker device, etc.), one or more capabilities of, or actions that can be performed by, each device (e.g. turn on, turn off, increase volume, decrease volume, increase speed, decrease speed, etc.), and/or other suitable attributes or traits associated with the device. In this manner, the transcription can be compared against the device attributes specified in the device topology representation to determine the one or more selected devices. For instance, the interpreter 110 can compare one or more terms in the transcription with the one or more device attributes for the devices to determine a correlation. For instance, if the transcription reads "increase the temperature," the interpreter 110 can attempt to identify one or more devices having suitable attributes associated with an action of increasing a temperature. In this manner, the interpreter 110 may be able to narrow the appropriate devices to the "upstairs thermostat" and the "downstairs thermostat."

In some implementations, the interpreter 110 can determine the one or more selected devices based at least in part on a location of the user when the user provides the voice utterance to the control device 102. As indicated, the control device 102 can be a smart device or a user device to which the voice utterance is provided. The interpreter 110 may determine the location of the control device 102, and correlate the location of the control device 102 to the location of the user. For instance, in instances wherein the control device 102 is a smart device specified in the device topology representation 116, the interpreter 110 can access the device topology representation to determine the location (e.g. the structure and the room specified in the device topology representation 116). The interpreter 110 can then correlate the user location to the location of the control device 102 to which the user provided the voice command.

In instances wherein the control device 102 is not specified within the device topology representation 116 (e.g. when the control device 102 is a user device or other suitable control device), one or more alternative location determination techniques can be used. For instance, in some implementations, the control device 102 can be located using one or more wireless (e.g. Wi-Fi) access points. A location of the control device 102 can be determined based at least in part on the known locations of the one or more access points, and one or more signals communicated between the control device 102 and the one or more access points. More particularly, in some implementations, the location of the user device can be determined based at least in part on round trip time (RTT) calculations associated with one or more signals communicated between the user device and one or more access points. For instance, the user device can initiate a location finding process by sending a signal to a plurality of access points. The access points can send one or more response signals to the user device. The response signals can include data indicative of a time delay (e.g., processing delay) between when the respective access point received the initiating signal and sent the response signals. The user device can calculate the times-of-flight associated with the initiating signals and/or response signals based, at least in part, on the time at which the user device sent the initiating signals, the time at which the user device received the response signals, and/or the time delay associated with an access point. If the user device receives response signals from three or more access points, the user device can apply trilateration techniques to the determined distances and locations to locate itself relative to the access points. For example, the user device can determine that it is located at a particular location within an area (e.g., within a particular room).

Similarly, in some implementations, a location of the control device 102 can be determined using one or more beacon devices (e.g. Bluetooth beacon devices). For instance, the location of the control device can be determined based at least in part on the known locations of the beacon devices, and one or more signals communicated between the beacon devices and the control device 102. It will be appreciated that various other suitable location determination techniques can be used without deviating from the scope of the present disclosure. More particularly, in determining the user device location, the user device can broadcast one or more signals that can be received by two or more beacon devices located within the structure in which the user is located. The beacon devices can have known locations within the structure. In some implementations, the beacon devices can be implemented within one or more smart devices defined in the device topology representation 116. In response to receiving the one or more signals, the two or more beacon devices can broadcast one or more identifying signals respectively identifying the beacon devices. The identifying signals can include locations of the respective beacon devices. The location of the user device can then be determined based at least in part on the beacon locations specified within the received identifying signals.

It will be appreciated that various other location determination techniques can be used without deviating from the scope of the present disclosure. For instance, location determination techniques can be implemented using various suitable communication signals, such as Bluetooth, Bluetooth low energy, ZigBee, Near Field Communication, Wi-Fi Direct, or other technologies. In alternative embodiments, the user's location can be determined at least in part by a positioning system associated with the user device (e.g. GPS or other positioning system), and/or a network based (e.g. WiFi, cellular network, etc.) location determination.

In some implementations, the location of the control device 102 can be determined relative to the device topology representation 116. For instance, in implementations wherein the location of the control device 102 is determined using wireless access points and/or beacon devices, the locations of the access points and/or beacon devices can be mapped to one or more rooms within the device topology representation 116. In this manner, the location of the control device 102 relative to the device topology representation 116 can then be determined based at least in part on the locations of the access points and/or beacon devices within the device topology representation 116.

As indicated, the interpreter 110 can determine the selected devices based at least in part on the location of the control device at the time of the provision of the voice utterance by the user. The interpreter 110 can infer that the selected devices will be located in the same room in which the user is located. As an example, if the transcription reads "turn on the lights," the interpreter 110 can determine that the user is located in the bedroom, and can infer that the light devices to which the user is referring are the light devices associated with the bedroom in the device topology representation 116 (e.g. "overhead lights").

One or more of the above described interpretation techniques can be used by the interpreter 110 to interpret the transcription. For instance, in various instances, the selected device(s) may be determined based at least in part on one or more of the device identifiers, the device attributes, or the user location.

The interpreter 110 can further determine one or more selected actions to be performed. For instance, the interpreter 110 can analyze the transcription to determine the one or more actions. For instance, the interpreter 110 can analyze a transcription that reads "turn on the lights," and can determine that the phrase "turn on" corresponds to an action of activating or turning on a device. In some implementations, the interpreter 110 can determine the actions to be performed based at least in part on the device attributes specified in the device topology representation 116. For instance, once the selected devices have been determined, the interpreter 110 can compare the transcription against the device attributes of the selected devices to determine a correlation between the transcription and the device attributes.

Once the selected device(s) and the actions to be performed have been determined, one or more control commands can be determined instructing the selected device(s) to perform the appropriate action(s). In particular, data indicative of the selected device(s) and the action(s) to be performed can be provided to the command generator 112. The command generator 112 can determine one or more suitable control commands for the selected device(s). As indicated, the control commands can be any suitable control command for communicating with the selected device(s). In particular, the control commands can be determined based at least in part on one or more communication protocols associated with the selected device(s). In this manner, the control commands can be in any suitable format or structure based at least in part on the communication protocols of the selected device(s). Command generator 112 can provide the control commands to the selected device(s), such that the selected device(s) can execute the control commands and perform the appropriate action(s).

Although the system 100 is depicted as having a client-server architecture, it will be appreciated that one or more of the functions of the server 104 (e.g. one or more of the functions of the biaser 106, transcriber 108, interpreter 110, or command generator 112) can be performed by one or more other suitable devices, such as for instance, the control device 102. In this manner, it will be appreciated that the control device 102 can include one or more of the biaser 106, transcriber 108, interpreter 110, or command generator 112.

Figure 4:
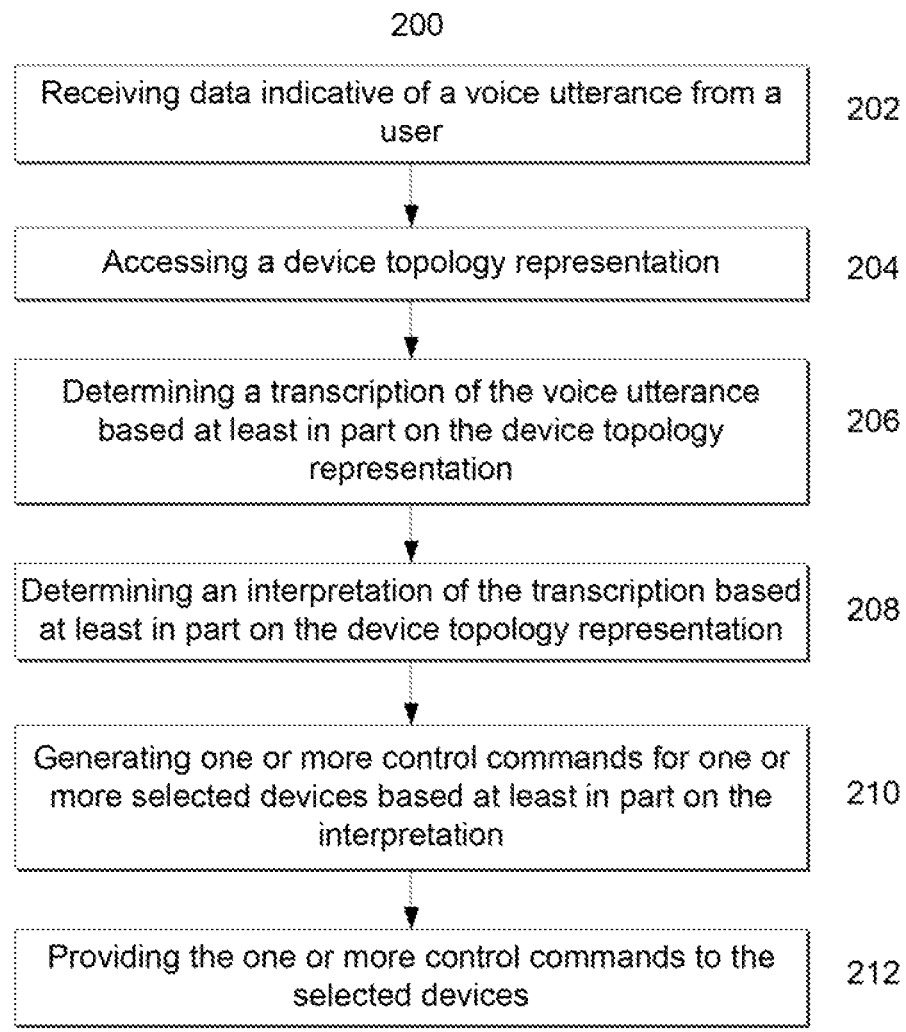
FIG. 4 depicts a flow diagram of an example method of processing voice commands according to example embodiments of the present disclosure.

FIG. 4 depicts a flow diagram of an example method (200) of processing voice commands according to example embodiments of the present disclosure. Method (200) can be implemented by one or more computing devices, such as one or more of the computing devices depicted in FIG. 8. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving data indicative of a voice utterance from a user. As indicated the user may provide a voice utterance to a control device with the intention of controlling one or more smart devices.

At (204), method (200) can include accessing a device topology representation associated with the user. As indicated, the user can set up or construct a device topology representation defining a topology of one or more structures associated with the user. For instance, the user can organize the structure(s) into rooms, and can assign devices to the rooms. The user can assign device identifiers to the devices. The device topology representation can further include one or more device attributes for the devices. The device attributes can specify device types, capabilities, etc. In this manner, the device topology representation can provide allow a user to organize a smart home or internet of things network by location of the devices.

At (206), method (200) can include determining a transcription of the voice utterance based at least in part on the device topology representation. For instance, transcription can be determined based at least in part on one or more language models. For instance, in some implementations, the transcription can be determined by biasing a general language model towards one or more terms specified in the device topology representation (e.g. device identifiers, room names, structure names, device attributes, etc.). In this manner, a personalized language model can be generated having increased probability estimates associated with the terms of the device topology representation. Data indicative of the voice utterance can be provided to the personalized language model to determine a transcription of the voice utterance. In some implementations, the data indicative of the voice utterance can be provided to one or more additional language models to determine the transcription.

At (208), method (200) can include determining an interpretation of the transcription based at least in part on the device topology representation. For instance, determining the interpretation can include determining one or more selected devices and one or more actions to be performed by the selected devices based at least in part on the transcription and the device topology representation. The one or more selected devices can be devices specified in the device topology representation, and the one or more actions to be performed can be actions associated with one or more device attributes associated with the selected devices.

At (210), method (200) can include generating one or more control commands for the one or more selected devices based at least in part on the interpretation. The one or more control commands can include instructions for the respective selected devices to perform the appropriate actions. The control commands can be any suitable control command capable of being understood by the associated smart devices. At (212), the method (200) can include providing the one or more control commands to the selected devices, such that the selected devices can execute the control commands and perform the appropriate actions.

Figure 5:
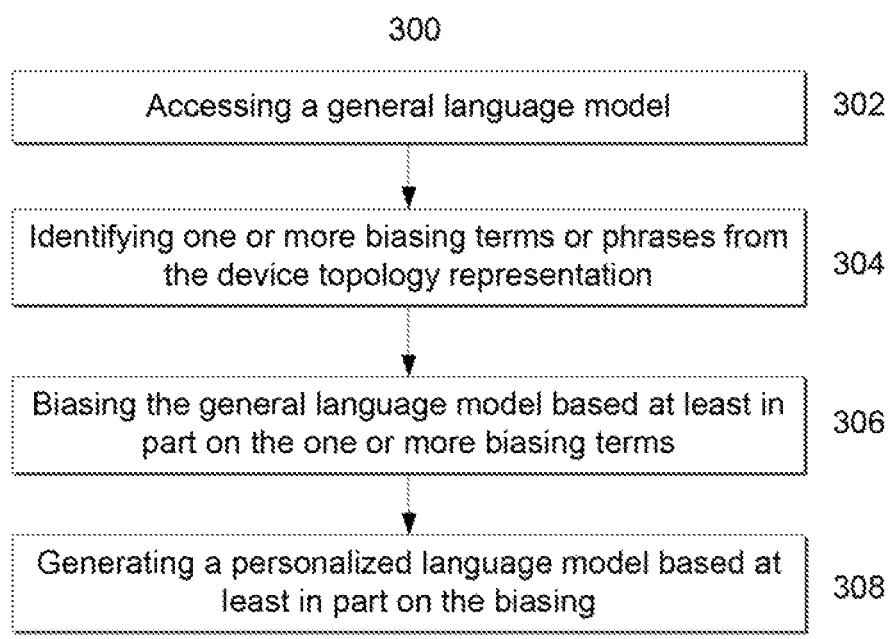
FIG. 5 depicts a flow diagram of an example method of generating a personalized language model according to example embodiments of the present disclosure.

FIG. 5 depicts a flow diagram of an example method (300) of generating a personalized language model according to example embodiments of the present disclosure.

Figure 8:
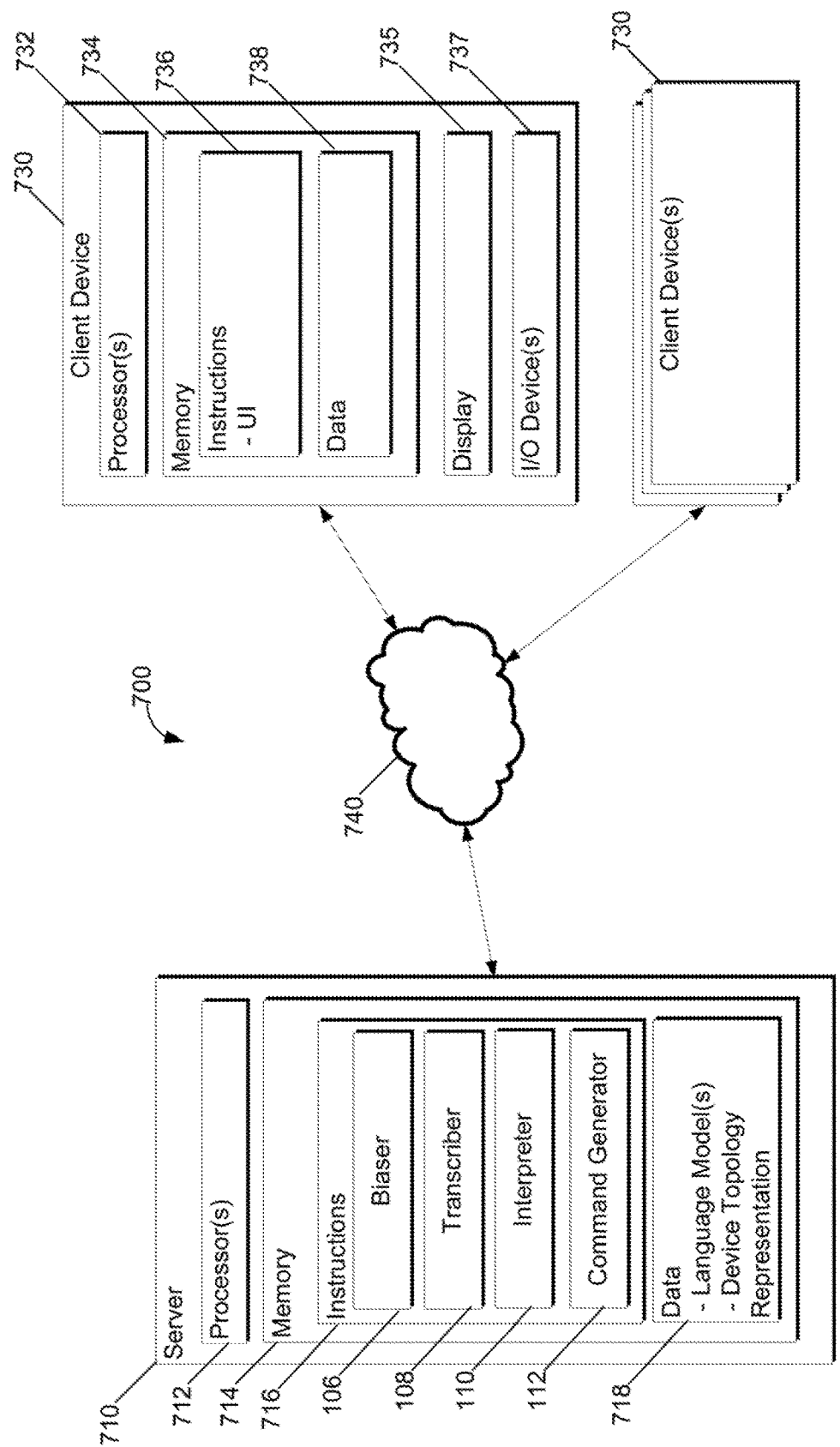
FIG. 8 depicts an overview of an example system according to example embodiments of the present disclosure.

Method (300) can be implemented by one or more computing devices, such as one or more of the computing devices depicted in FIG. 8. In some implementations, the method (300) can be implemented by the biaser 106 depicted in FIG. 1.

At (302), method (300) can include accessing a general language model. As indicated, the general language model can include a plurality of common phrases. A phrase can be a sequence of one or more words. The general language model can further include probability estimates associated with each phrase indicative of an estimation of the probability of the occurrence of the associated phrase.

At (304), method (300) can include identifying one or more biasing terms or phrases from the device topology representation. For instance, the one or more biasing terms or phrases can include device identifiers, room identifiers, structure identifiers, device attributes, and/or other suitable terms or phrases associated with the device topology representation.

At (306), method (300) can include biasing the general language model based at least in part on the one or more biasing terms. For instance, biasing the general language model can include adjusting one or more probability estimates of the general language model based at least in part on the biasing terms. In particular, biasing the general language model can include increasing the probability estimates of the biasing terms to increase an estimated probability of occurrence of the biasing terms. At (308), method (300) can include generating a personalized language model based at least in part on the biasing. For instance, the personalized language model can be generated based on the general language model. The personalized language model can include the same set of phrases as the general language model, but can include probability estimates that are biased towards the biasing terms.

Figure 6:
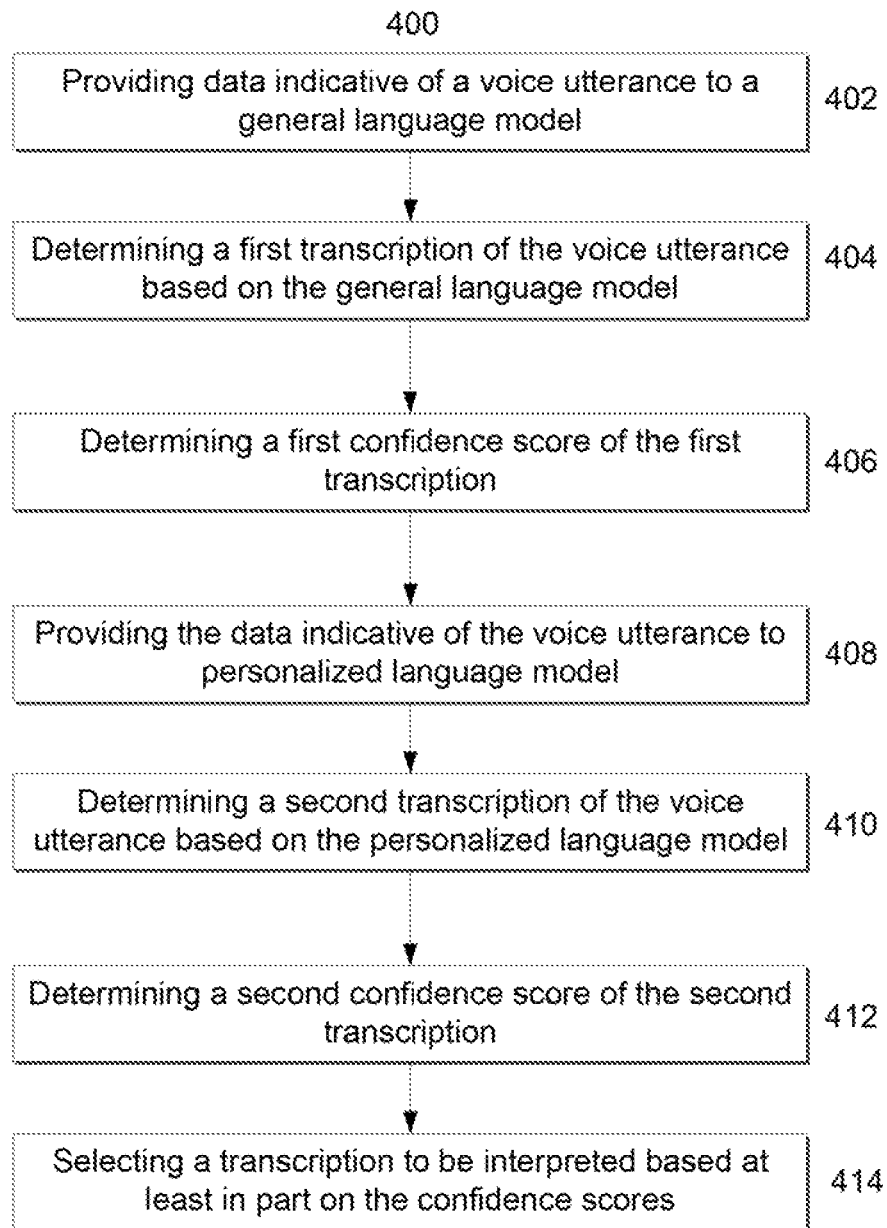
FIG. 6 depicts a flow diagram of an example method of determining a transcription of a voice utterance according to example embodiments of the present disclosure.

FIG. 6 depicts a flow diagram of an example method (400) of determining a text transcription of a voice utterance according to example embodiments of the present disclosure. Method (400) can be implemented by one or more computing devices, such as one or more of the computing devices depicted in FIG. 8. In some implementations, the method (300) can be implemented by the transcriber 108 depicted in FIG. 1.

At (402), method (400) can include providing data indicative of a voice utterance to a general language model. At (404), method (400) can include determining a first transcription of the voice utterance based at least in part on the general language model. The first transcription can be determined using various suitable speech recognition techniques. At (406), method (400) can include determining a first confidence score of the first transcription. The first confidence score can be a representation of an estimation of the accuracy of the first transcription of the voice utterance.

At (408), method (400) can include providing the data indicative of a voice utterance to a personalized language model. The personalized language model can be determined based at least in part on a topology of a smart home or internet of things network (e.g. as specified in a device topology representation). For instance, the personalized language model can be the language model described in FIG. 5. At (410), method (400) can include determining a second transcription of the voice utterance based at least in part on the personalized language model. The second transcription can be determined using various suitable speech recognition techniques. At (412), method (400) can include determining a second confidence score of the second transcription. The second confidence score can be a representation of an estimation of the accuracy of the second transcription of the voice utterance.

At (414), method (400) can include selecting a transcription to be interpreted based at least in part on the confidence scores. For instance, the transcription having the higher confidence score can be determined to be a more accurate transcription of the voice utterance, and can be selected as the transcription to be interpreted. In some implementations, one or more additional transcriptions can be determined using one or more additional language models. Additional confidence scores can be determined for the respective additional transcriptions. The transcription to be interpreted can be selected based at least in part on each confidence score.

Figure 7:
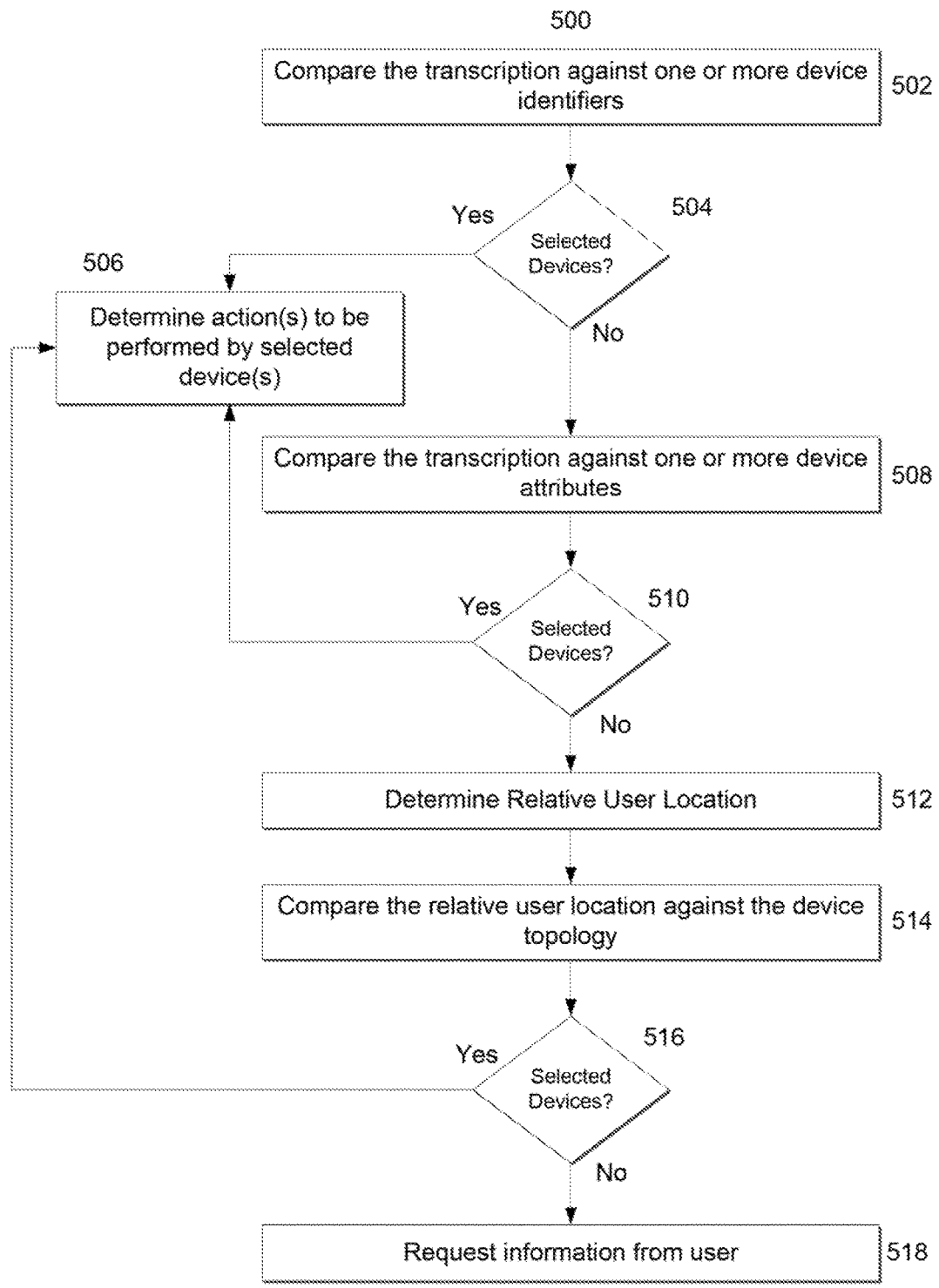
FIG. 7 depicts a flow diagram of an example method of interpreting a transcription of a voice utterance according to example embodiments of the present disclosure.

FIG. 7 depicts a flow diagram of an example method (500) of interpreting a transcription of a voice utterance according to example embodiments of the present disclosure. Method (500) can be implemented by one or more computing devices, such as one or more of the computing devices depicted in FIG. 8. In some implementations, the method (300) can be implemented by the interpreter 110 depicted in FIG. 1.

At (502), method (500) can include comparing the transcription against one or more device identifiers specified in a device topology representation. At (504), method (500) can include determining whether the selected devices can be determined based at least in part on the device identifiers. For instance, the selected devices can be determined if a correlation can be made between the device identifier(s) and the transcription. A correlation can be made if one or mode device identifiers if one or more device identifiers match one or more terms in the transcription and/or if one or more device identifiers are sufficiently similar to one or more terms in the transcription. In some implementations, the selected devices may not be able to be determined if correlations are made between multiple devices specified in the device topology representation and the transcription. For instance, if multiple devices have the same or similar device identifier, the selected devices may not be able to be determined. If the selected device(s) can be determined, at (506), method (500) can include determining the selected device(s) and the actions to be performed by the selected devices.

If the selected devices are not able to be determined, at (508), method (500) can include comparing the transcription against one or more device attributes specified in the device topology representation. As indicated, the device attributes can be indicative of device types and/or one or more capabilities of the devices. In this manner, the device attributes can be compared to one or more terms in the transcription to determine a correlation between the one or more terms and the device attributes. A correlation of the transcription and one or more device attributes can provide evidence as to the selected devices. For instance, if a correlation is found, it can be determined that only devices having the correlated device attribute should be selected as the selected device. In this manner, a correlation can help to narrow the devices in determining the selected devices.

At (510), method (500) can include determining whether the selected devices can be determined. In particular, determining whether the selected devices can be determined can include determining whether the selected devices can be determined based at least in part on the comparison of the transcription against the one or more device attributes and/or the one or more device identifiers. If the selected devices can be determined, method (500) can return to (506), and the one or more actions to be performed can be determined.

If the selected devices cannot be determined, at (512), method (500) can include determining a location of the user relative to the device topology representation. As indicated, in instances wherein the control device is a device specified within the organizational topology of the device topology representation, the location of the user can correspond to the location of the control device within the device topology representation. In instances wherein the control device is not specified within the device topology representation, the user location can be determined based on various suitable location determination techniques, such as techniques using wireless access points and/or beacon devices. Such determined user location can then be mapped to a structure and a room specified in the device topology representation.

At (514), method (500) can include comparing the relative user location against the device topology specified in the device topology representation. For instance, the location of the user within the structure can be compared against the devices associated with that location as specified within the device topology representation. In this manner, it can be inferred that the selected devices are devices located in the room in which the user is located. For instance, if the transcription reads "turn on the lights," the devices located in the room in which the user is located can be analyzed to identify one or more lighting devices associated with that room. In this manner, it can be inferred that the devices selected as the selected devices should be lighting devices located within the room in which the user is currently located.

At (516), method (500) can include determining whether the selected devices can be determined. In particular, determining whether the selected devices can be determined can include determining whether the selected devices can be determined based at least in part on the comparison of the transcription against the one or more device attributes the one or more device identifiers, and/or the relative user location. If the selected devices can be determined, method (500) can include returning to (506), and the actions to be performed can be determined. If the selected devices cannot be determined, at (518), method (500) can include requesting more information from the user. For instance, a prompt can be presented to the user in a user interface of the control device or other suitable device asking the user for more information regarding the voice command.

It will be appreciated that, in various instances, the selected devices and/or the actions to be performed can be determined based at least in part on one or more of the device identifiers, the device attributes, or the relative user location. In this manner, various data associated with the user and/or the device topology representation can be accessed and/or determined to determine or infer the one or more selected devices associated with the voice utterance. Depending on the transcription and the particular organization of the device topology representation, various suitable combinations of the above referenced factors can be used to determine the selected devices and/or the actions to be performed. In this manner, it will be appreciated that various aspects of the device topology representation and/or user location can be used in various manners to determine the selected devices and/or the actions to be performed.

FIG. 8 depicts an example computing system 700 that can be used to implement the methods and systems according to example aspects of the present disclosure. The system 700 can be implemented using a client-server architecture that includes a server 710 that communicates with one or more client devices 730 over a network 740. The system 700 can be implemented using other suitable architectures, such as a single computing device.

The system 700 includes a server 710, such as a web server. The server 710 can be implemented using any suitable computing device(s). The server 710 can have one or more processors 712 and one or more memory devices 714. The server 710 can also include a network interface used to communicate with one or more client devices 730 over the network 740. The network interface can include any suitable components for interfacing with one more networks, including for example, transmitters, receivers, ports, controllers, antennas, or other suitable components.

The one or more processors 712 can include any suitable processing device, such as a microprocessor, microcontroller, integrated circuit, logic device, or other suitable processing device. The one or more memory devices 714 can include one or more computer-readable media, including, but not limited to, non-transitory computer-readable media, RAM, ROM, hard drives, flash drives, or other memory devices. The one or more memory devices 714 can store information accessible by the one or more processors 712, including computer-readable instructions 716 that can be executed by the one or more processors 712. The instructions 716 can be any set of instructions that when executed by the one or more processors 712, cause the one or more processors 712 to perform operations. For instance, the instructions 716 can be executed by the one or more processors 712 to implement the biaser 106, transcriber 108, interpreter 110, or command generator 112 described with reference to FIG. 1.

As shown in FIG. 8, the one or more memory devices 714 can also store data 718 that can be retrieved, manipulated, created, or stored by the one or more processors 712. The data 718 can include, for instance, language model data, device topology representation data, and other data. The data 718 can be stored in one or more databases. The one or more databases can be connected to the server 710 by a high bandwidth LAN or WAN, or can also be connected to server 710 through network 740. The one or more databases can be split up so that they are located in multiple locales.

The server 710 can exchange data with one or more client devices 730 over the network 740. Any number of client devices 730 can be connected to the server 710 over the network 740. One or more of the client devices 730 can be a smart device configured to provide home automation services, smart home services, internet of things services, and/or other suitable services. The smart devices can include, or can otherwise be associated with an air conditioning system, lighting device, home theater and entertainment system, security system, automatic door locking system, thermostat device, home automation system, sound speaker, camera device, treadmill, weight scale, smart bed, irrigation system, garage door opener, appliance, baby monitor, fire alarm, and/or other suitable device or system. One or more of the client device may also be a user computing device, such as a general purpose computer, special purpose computer, laptop, desktop, mobile device, navigation system, smartphone, tablet, wearable computing device, a display with one or more processors, or other suitable computing device.

Similar to the server 710, a client device 730 can include one or more processor(s) 732 and a memory 734. The one or more processor(s) 732 can include one or more central processing units (CPUs), graphics processing units (GPUs) dedicated to efficiently rendering images or performing other specialized calculations, and/or other processing devices. The memory 734 can include one or more computer-readable media and can store information accessible by the one or more processors 732, including instructions 736 that can be executed by the one or more processors 732 and data 738. For instance, the memory 734 can store instructions 736 for implementing a user interface.

The client device 730 of FIG. 8 can include various input/output devices 737 for providing and receiving information from a user, such as a touch screen, touch pad, data entry keys, speakers, and/or a microphone suitable for voice recognition. For instance, the client device 730 can have a display device 735 for presenting a user interface according to example aspects of the present disclosure.

The client device 730 can also include a network interface used to communicate with one or more remote computing devices (e.g. server 710) over the network 740. The network interface can include any suitable components for interfacing with one more networks, including for example, transmitters, receivers, ports, controllers, antennas, or other suitable components.

The network 740 can be any type of communications network, such as a local area network (e.g. intranet), wide area network (e.g. Internet), cellular network, or some combination thereof. The network 740 can also include a direct connection between a client device 730 and the server 710. In general, communication between the server 710 and a client device 730 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

One example aspect of the present disclosure is directed to a computer-implemented method of processing voice utterances. The method can include receiving, by one or more computing devices, data indicative of a voice utterance. The voice utterance can have been provided by a user to a control device. The method can include accessing, by the one or more computing devices, a device topology representation. The device topology representation can define a plurality of smart devices associated with one or more structures. The device topology representation can further define a location of each of the plurality of devices and the control device within the associated structures. The method can include determining, by the one or more computing devices, one or more selected devices and one or more actions to be performed by the one or more selected devices based at least in part on the data indicative of the voice utterance and the further based at least in part on the location of the control device within the associated structure as defined by the device topology representation.

In some implementations, determining, by the one or more computing devices, the one or more selected devices can include: identifying, by the one or more computing devices, a subset of the plurality of devices that share a same location as the control device; and determining, by the one or more computing devices, the one or more selected devices from the identified subset of the plurality of devices.

In some implementations, the device topology representation can define one or more rooms within each of the one or more structures. The location of each of the plurality of devices and the control device defined by the device topology representation can respectively correspond to at least one of the one or more rooms.

In some implementations, determining, by the one or more computing devices, the one or more selected devices can include: identifying, by the one or more computing devices, a subset of the plurality of devices that are located in a same room as the control device; and determining, by the one or more computing devices, the one or more selected devices from the identified subset of the plurality of devices.

In some implementations, determining, by the one or more computing devices, the one or more selected devices from the identified subset of the plurality of devices can include: identifying, by the one or more computing devices, one or more device attributes referenced by the voice utterance; and identifying, by the one or more computing devices, which of the subset of the plurality of devices has the one or more device attributes.

In some implementations, the control device is one of the plurality of devices.

In some implementations, the device topology representation can specify one or more device identifiers and one or more device attributes for each of the plurality of devices.

In some implementations, determining, by the one or more computing devices, the one or more selected devices and the one or more actions can include determining, by the one or more computing devices, the one or more selected devices and the one or more actions based at least in part on at least one of the one or more device identifiers specified in the device topology representation.

In some implementations, determining, by the one or more computing devices, the one or more selected devices and the one or more actions can include determining, by the one or more computing devices, the one or more selected devices and the one or more actions based at least in part on at least one of the one or more device attributes specified in the device topology representation.

In some implementations the method can further include determining, by the one or more computing devices, one or more control commands based at least in part on the one or more selected devices and the one or more actions, the one or more control commands respectively instructing the one or more selected devices to perform the one or more actions. In some implementations the method can further include providing, by the one or more computing devices, the one or more control commands to the one or more selected devices.

In some implementations, the one or more computing devices that execute the method can consist of the control device.

Another example aspect of the present disclosure is directed to a computing system that includes one or more processors and one or more memory devices. The one or more memory devices can store computer-readable instructions that when executed by the one or more processors cause the one or more processors to perform operations. The operations can include receiving data indicative of a voice utterance. The voice utterance can have been provided by a user to a control device. The operations can include accessing a device topology representation. The device topology representation can define a plurality of smart devices associated with one or more structures. The device topology representation can further define a location of each of the plurality of devices and the control device within the associated structures. The operations can include determining one or more selected devices and one or more actions to be performed by the one or more selected devices based at least in part on the data indicative of the voice utterance and the further based at least in part on the location of the control device within the associated structure as defined by the device topology representation.

In some implementations, determining the one or more selected devices can include: identifying a subset of the plurality of devices that share a same location as the control device; and determining the one or more selected devices from the identified subset of the plurality of devices.

In some implementations, the device topology representation can define one or more rooms within each of the one or more structures. The location of each of the plurality of devices and the control device defined by the device topology representation can respectively correspond to at least one of the one or more rooms.

In some implementations, determining the one or more selected devices can include: identifying a subset of the plurality of devices that are located in a same room as the control device; and determining the one or more selected devices from the identified subset of the plurality of devices.

In some implementations, determining the one or more selected devices from the identified subset of the plurality of devices can include: identifying one or more device attributes referenced by the voice utterance; and identifying which of the subset of the plurality of devices has the one or more device attributes.

In some implementations, the operations can further include: determining one or more control commands based at least in part on the one or more selected devices and the one or more actions, the one or more control commands respectively instructing the one or more selected devices to perform the one or more actions; and providing the one or more control commands to the one or more selected devices.

In some implementations, the computing system can include the control device and the control device can include the one or more processors and the one or more memory devices.

Another example aspect of the present disclosure is directed to a computer-implemented method. The method can include obtaining, by one or more computing devices, a device topology representation that describes a respective location for each of a plurality of devices included in the device topology representation. The plurality of devices can include one or more control devices. The method can include obtaining, by the one or more computing devices, a voice utterance. The method can include identifying, by the one or more computing devices, a first control device of the one or more control devices to which the voice utterance was provided by a user. The method can include determining, by the one or more computing devices, a subset of the plurality of devices that are described by the device topology representation as having a same location as the first control device to which the voice utterance was provided. The method can include determining, by the one or more computing devices, one or more selected devices from the subset of the plurality of devices based at least in part on the data indicative of the voice utterance.

In some implementations, the device topology representation can specify a particular room for each of the plurality of devices. In some implementations, determining, by the one or more computing devices, a subset of the plurality of devices can include identifying, by the one or more computing devices, the subset of the plurality of devices for which the device topology representation specifies a same room as the first control device to which the voice utterance was provided.

In some implementations, the one or more computing devices can consist of the first control device such that the first control device performs the computer-implemented method. In some implementations, the plurality of devices can include a plurality of control devices. In some implementations, the plurality of control devices can be respectively associated with a plurality of locations. For example, the plurality of control devices can be respectively associated with a plurality of rooms.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of processing voice utterances, the method comprising:

receiving a plurality of user inputs directed at a device topology user interface used to update a device topology representation, the device topology representation defining a plurality of smart devices associated with one or more structures and a location of each of the plurality of smart devices within the one or more structures;

adding, to the device topology representation and based on the plurality of user inputs directed at the device topology user interface:
  a given smart device,
  a device identifier of the given smart device,
  the one or more structures,
  one or more rooms as a given location of the given smart device within the one or more structures, and
  one or more device attributes for the given smart device, wherein the one or more device attributes for the given smart device are associated with one or more action the given smart device is configured to perform;

subsequent to adding to the device topology representation based on the plurality of user inputs directed to the device topology representation:
  receiving, by one or more computing devices, data indicative of a voice utterance, the voice utterance provided by a user to a control device;
  accessing, by the one or more computing devices, the device topology representation;
  determining, by the one or more computing devices, a transcription of the voice utterance based on the device topology representation, wherein determining the transcription of the voice utterance based on the device topology representation comprises:
    identifying one or more biasing terms or phrases associated with the accessed device topology representation, biasing a general language model based on one or more of the identified biasing terms or phrases associated with the accessed device topology representation, and determining the transcription based on the biasing; and determining, by the one or more computing devices, one or more selected devices, from the plurality of smart devices, and one or more corresponding actions to be performed by the one or more selected devices based at least in part on the determined transcription and the device topology representation.

2. The computer-implemented method of claim 1, wherein determining, by the one or more computing devices, the transcription of the voice utterance further comprises:

providing, by the one or more computing devices, data indicative of the voice utterance to the general language model;

determining, by the one or more computing devices, a first transcription of the voice utterance based at least in part on the general language model; and determining, by the one or more computing devices, a first confidence score associated with the first transcription.

3. The computer-implemented method of claim 2, wherein determining, by the one or more computing devices, the transcription of the voice utterance further comprises:

providing, by the one or more computing devices, the data indicative of the voice utterance to a personalized language model, the personalized language model being determined based at least in part on the device topology representation;

determining, by the one or more computing devices, a second transcription of the voice utterance based at least in part on the personalized language model;

determining, by the one or more computing devices, a second confidence score associated with the second transcription; and selecting, by the one or more computing devices either the first transcription or the second transcription to be interpreted based at least in part on the first and second confidence scores.

4. The computer-implemented method of claim 1, wherein determining, by the one or more computing devices, the one or more selected devices and the one or more corresponding actions is further based at least in part on contextual data associated with the user.

5. The computer-implemented method of claim 4, wherein the contextual data associated with the user comprises location data associated with the user relative to the locations of one or more of the smart devices specified in the device topology representation.

6. The computer-implemented method of claim 1, wherein the device topology representation further includes one or more corresponding device identifiers for each of the plurality of smart devices, and one or more corresponding device attributes for each of the plurality of smart devices.

7. The computer-implemented method of claim 6, wherein determining, by the one or more computing devices, the one or more selected devices and the one or more corresponding actions is further based at least in part on the one or more corresponding device identifiers specified in the device topology representation.

8. The computer-implemented method of claim 6, wherein determining, by the one or more computing devices, the one or more selected devices and the one or more corresponding actions is further based at least in part on at least one of the one or more corresponding device attributes specified in the device topology representation.

9. The computer-implemented method of claim 1, further comprising:

determining, by the one or more computing devices, one or more control commands based at least in part on the one or more selected devices and the one or more corresponding actions, the one or more control commands respectively instructing the one or more selected devices to perform the one or more corresponding actions; and providing, by the one or more computing devices, the one or more control commands to the one or more selected devices.

10. A computing system, comprising:

one or more processors; and one or more memory devices, the one or more memory devices storing computer-readable instructions that when executed by the one or more processors cause the one or more processors to perform operations, the operations comprising:

receiving a plurality of user inputs directed at a device topology user interface used to update a device topology representation, the device topology representation defining a plurality of smart devices associated with one or more structures and a location of each of the plurality of smart devices within the one or more structures;

adding, to the device topology representation and based on the plurality of inputs directed at the device topology user interface:

a given smart device, a device identifier of the given smart device, the one or more structures, one or more rooms as a given location of the given smart device within the one or more structures, and one or more device attributes for the given smart device, wherein the one or more device attributes for the given smart device are associated with one or more actions the given smart device is configured to perform;

subsequent to adding to the device topology representation based on the plurality of user inputs directed to the device topology representation:

receiving data indicative of a voice utterance, the voice utterance provided by a user to a control device;

accessing the device topology representation;

determining a transcription of the voice utterance based at least in part on the device topology representation, wherein determining the transcription of the voice utterance based on the device topology representation comprises:

identifying one or more biasing terms or phrases associated with the accessed device topology representation, biasing a general language model based on one or more of the identified biasing terms or phrases associated with the accessed device topology representation, and determining the transcription based on the biasing; and determining one or more selected devices, from the plurality of smart devices, and one or more corresponding actions to be performed by the one or more selected devices based at least in part on the determined transcription and the device topology representation.

11. The computing system of claim 10, the operations further comprising: determining a location of the user based at least in part on a location of the control device.

12. The computing system of claim 11, wherein the location associated with the user is determined based at least in part on a location of the control device as specified in the device topology representation.

13. The computing system of claim 11, wherein determining the one or more selected devices and the one or more corresponding actions is further based at least in part on the location associated with the user relative to the location of each of the plurality smart devices specified in the device topology representation.

14. One or more tangible, non-transitory computer-readable media storing computer-readable instructions that when executed by one or more processors cause the one or more processors to perform operations, the operations comprising:
receiving a plurality of user inputs directed at a device topology user interface used to update a device topology representation, the device topology representation defining a plurality of smart devices associated with one or more structures and a location of each of the plurality of smart devices within the one or more structures;
adding, to the device topology representation and based on the plurality of inputs directed at the device topology user interface:
a given smart device,
a device identifier of the given smart device,
the one or more structures,
one or more rooms as a given location of the given smart device within the one or more structures, and
one or more device attributes for the given smart device, wherein the one or more device attributes for the given smart device are associated with one or more actions the given smart device is configured to perform;
subsequent to adding to the device topology representation and based on the plurality of user inputs directed to the device topology representation:
receiving data indicative of a voice utterance, the voice utterance provided by a user to a control device;
accessing device topology representation;
determining a transcription of the voice utterance based at least in part on the device topology representation, wherein determining the transcription of the voice utterance based on the device topology representation comprises:
identifying one or more biasing terms or phrases associated with the accessed device topology representation,
biasing a general language model based on one or more of the identified biasing terms or phrases associated with the accessed device topology representation, and
determining the transcription based on the biasing; and
determining one or more selected devices, from the plurality of smart devices, and one or more corresponding actions to be performed by the one or more selected devices based at least in part on the determined transcription and the device topology representation.

15. The one or more tangible, non-transitory computer-readable media of claim 14, wherein the device topology representation specifies one or more corresponding device identifiers for each of the plurality of smart devices, and one or more corresponding device attributes for each of the plurality of smart device.

16. The one or more tangible, non-transitory computer-readable media of claim 15, wherein determining the one or more selected devices and the one or more corresponding actions is further based at least in part on at least one of the one or more corresponding device identifiers specified in the device topology representation.

17. The one or more tangible, non-transitory computer-readable media of claim 15, wherein determining the one or more selected devices and the one or more corresponding actions is further based at least in part on at least one of the one or more corresponding device attributes specified in the device topology representation.

* * * * *